Oct. 11, 1932.   F. W. JAMES   1,882,627
CHANGE SPEED WHEEL
Filed Feb. 27, 1930   4 Sheets-Sheet 1
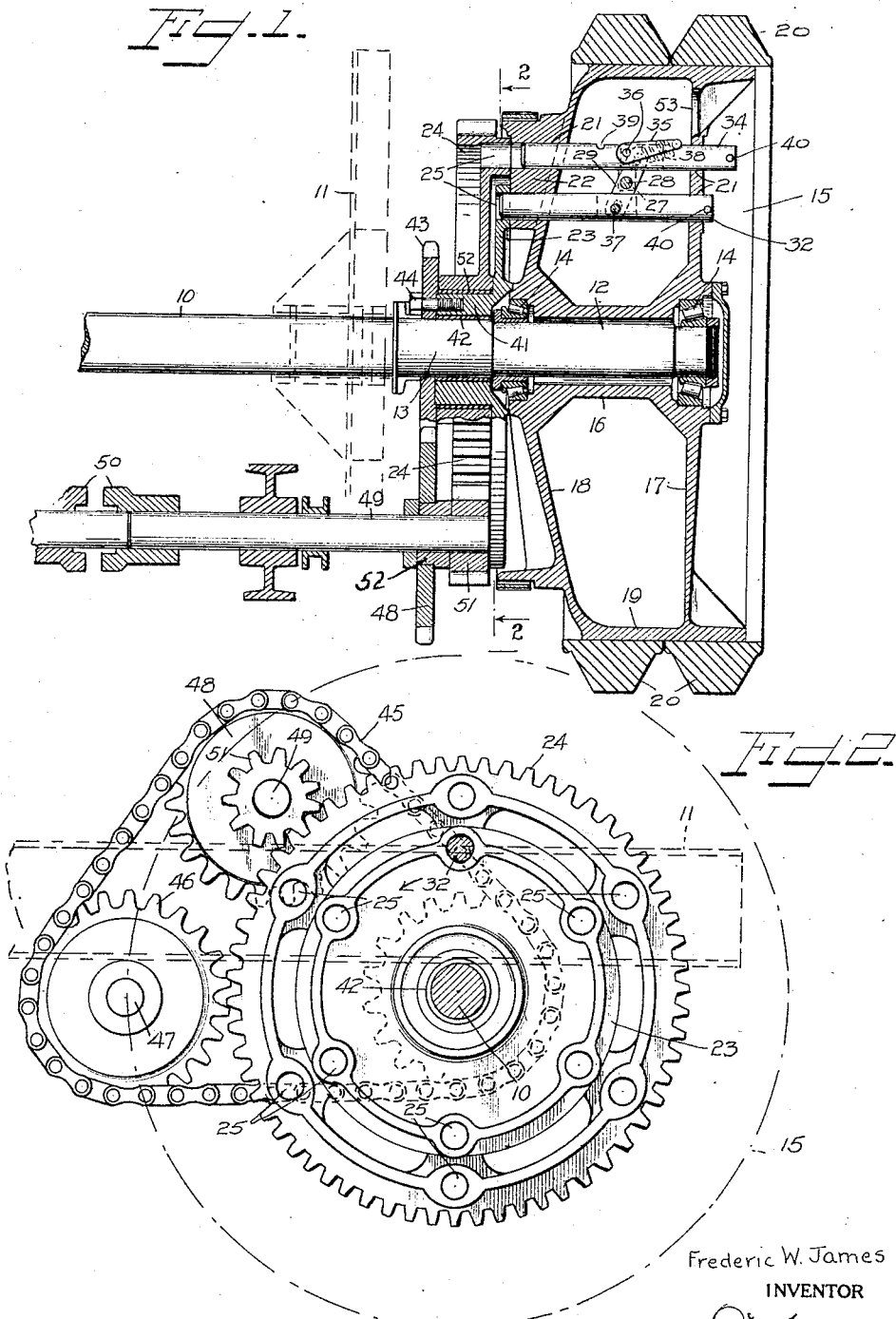
Frederic W. James
INVENTOR
BY
his ATTORNEY Oct. 11, 1932.  F. W. JAMES  1,882,627
CHANGE SPEED WHEEL
Filed Feb. 27, 1930   4 Sheets-Sheet 2
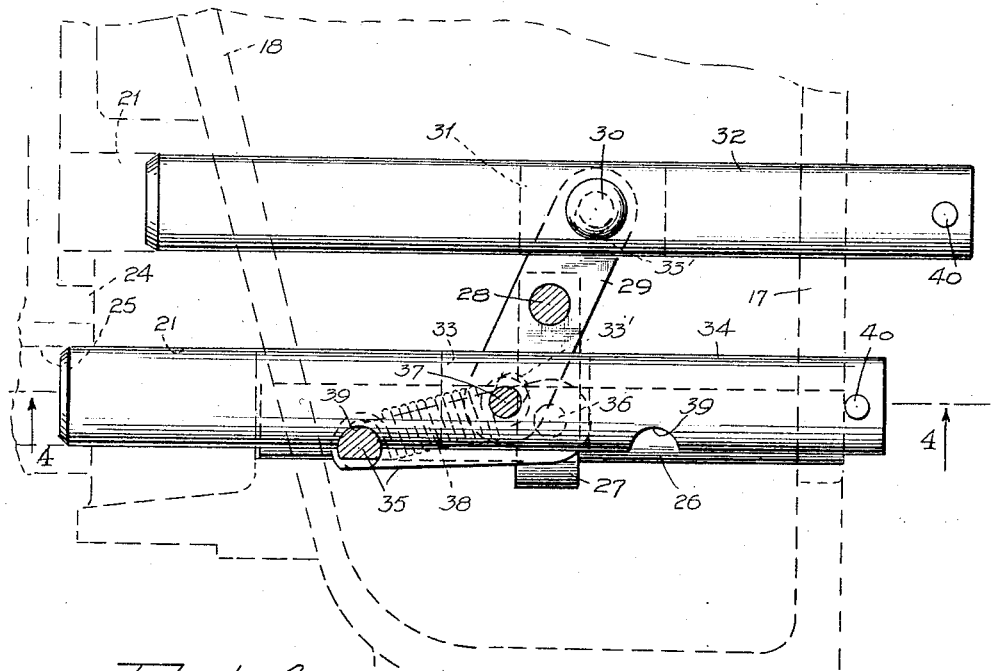
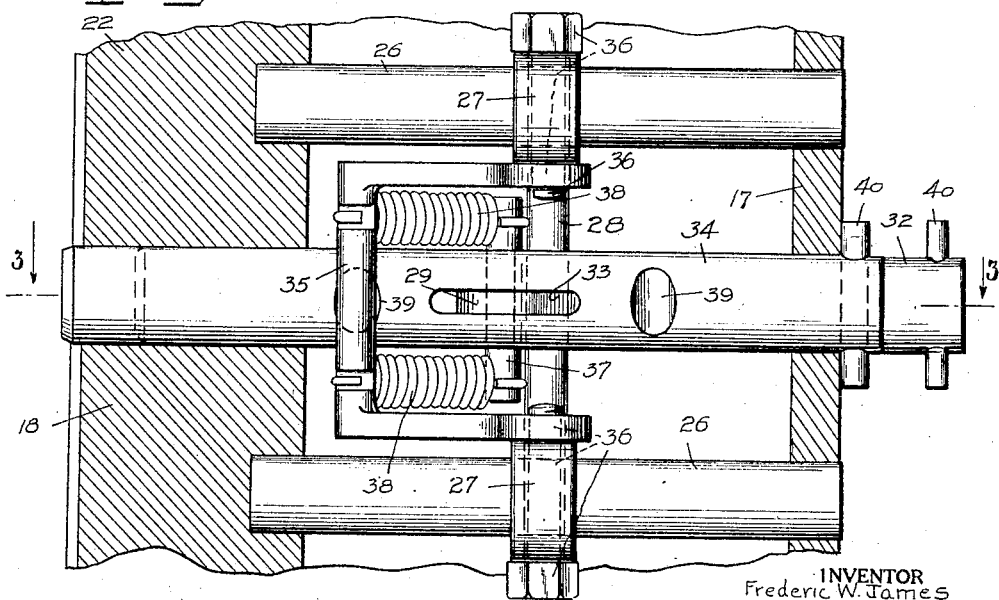
INVENTOR
Frederic W. James
BY Otto Munk
his ATTORNEY

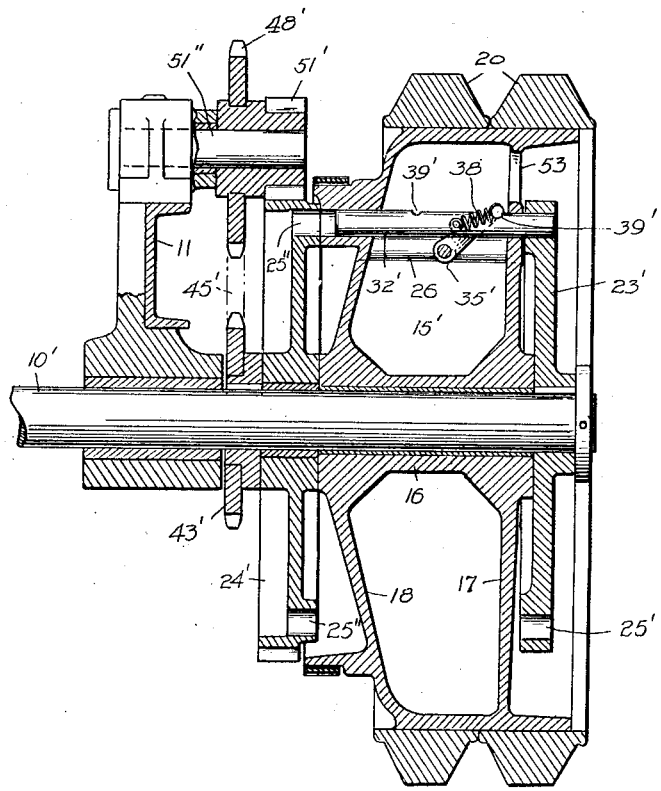

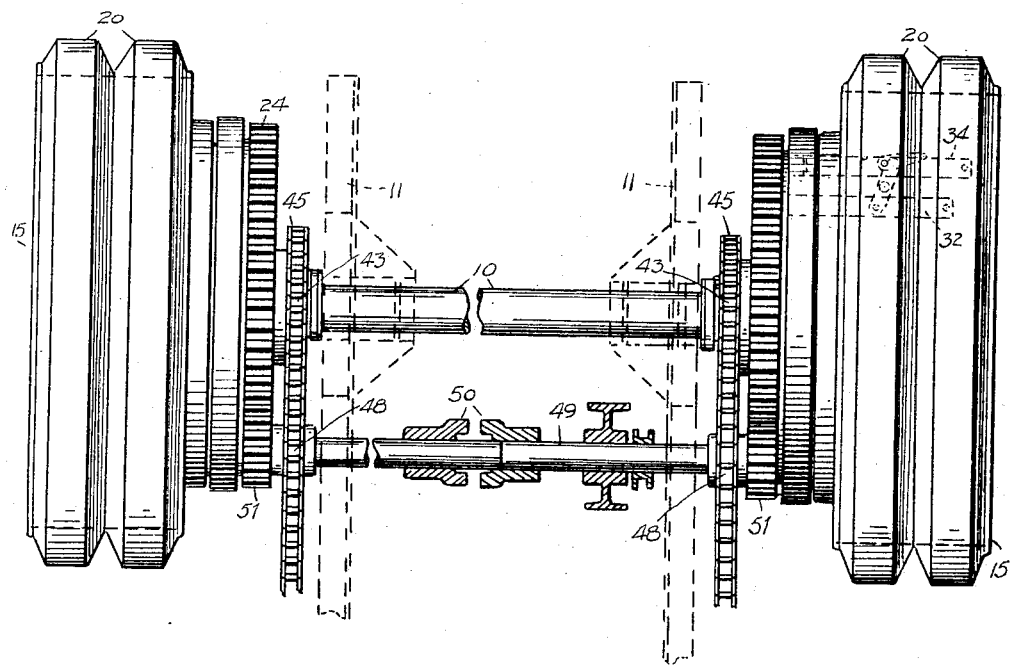

Patented Oct. 11, 1932

1,882,627

UNITED STATES PATENT OFFICE

FREDERIC W. JAMES, OF BELLEVILLE, NEW JERSEY, ASSIGNOR TO N. P. NELSON IRON WORKS, INC., OF PASSAIC, NEW JERSEY, A CORPORATION OF NEW JERSEY

CHANGE SPEED WHEEL

Application filed February 27, 1930. Serial No. 431,843.

This invention relates to change speed wheels for motor driven vehicles and particularly those of the slow moving tractor type.

Under normal working conditions, tractors are capable of very slow movement and while this slow speed is desirable and essential under working conditions, it is a great disadvantage when the tractor is called upon to transport itself under its own power from one place of operation to another or through the rapidly moving traffic of the city streets. It is therefore, the principal object of my invention to enable the ordinarily slow moving tractor to increase the speed thereof beyond its normal capacity. I accomplish this object by means of change speed wheels which include the combination and arrangement of parts hereinafter described in the specification, set forth in the appended claims, and illustratively exemplified in the accompanying drawings, in which, Figure 1 is a substantially longitudinal sectional view of the change speed wheel and associated parts according to the invention; Figure 2 is a sectional view of the traction wheel and drive therefor, taken on lines 2—2 of Figure 1; Figure 3 is a side elevational view of bolts and means for operating the latter; Figure 4 is a bottom plan view of the same; and Figure 5 is a substantially longitudinal sectional view of a modified change speed wheel and associated parts. Figure 6 is a top plan view of the change speed wheels and associated parts.

Referring to the drawings, 10 denotes the rear axle which is hung under the side beams 11 of a tractor chassis and which at its ends, is provided with two bearing surfaces 12 and 13. Adjacent opposite ends of each outer bearing surface 12, roller bearings 14 are mounted to support a traction wheel 15. The wheel 15 comprises an integral cast member having a hub 16 from which spaced discs 17 and 18 project to carry the rim 19, the latter being provided with a dual tread 20. The discs 17 and 18 are each provided with a pair of openings 21 arranged on a radial line and at the point in the inner disc 18 where the openings 21 are disposed, the material of the disc is increased in thickness and the face of the boss 22 thus formed, is finished off to accommodate the annular concentric faces of a driving disc 23 and a traction gear 24, each of which is provided with a plurality of spaced openings 25 arranged on circular lines corresponding with the axes of the openings 21 in the wheel discs 17 and 18.

Mounted in the interior of each wheel 15 between the discs 17 and 18, is a hanger 26 comprising a pair of spaced bars disposed axially of the wheel and attached at their ends to the discs 17 and 18. Blocks 27 project from the bars 26 and are secured thereto by bolts 36 and between their free ends, they support a bearing pin 28. Midway of the pin 28 is mounted a link 29 which is pivotally connected at one end on a pin 30 arranged between the walls of a slot 31 disposed in a tumbler or bolt 32, the latter being slidably mounted in the alined innermost openings 21 of each pair thereof in the discs 17 and 18. The other end of the link 29 projects between the walls of a slot 33 in a second tumbler or bolt 34, which operates in the outermost openings 21 of each pair in the discs 17 and 18. A yoke 35 projects between the two bars 26 and the ends of its arms are pivotally mounted on the ends of bolts 36 projecting from the inner sides of the blocks 27. The ends of the link 29 are provided with slots 33' through which the one pin 30 and a second pin 37 project, each pin being carried by its respective bolt, the pin 37 projecting beyond opposite sides of bolt 34 to receive the ends of springs 38, the opposite ends thereof being connected to the cross piece of the yoke 35, which virtually forms a handle whereby movement thereof in one direction or the other will cause the tumblers or bolts 32 and 36 to be thrown axially of themselves to points inside or outside the face of the boss 22. The outermost surface of the bolt at spaced points is provided with transverse grooves 39 into which the mid portion of the cross bar of the yoke 35 is seated when it is in its two extreme positions. The movement to project the bolts 34 and 32 is limited by stop pins 40 arranged at the ends of both bolts beyond the outside disc 17.

In Figure 1, the inner bolt 36 has been projected and is in engagement with one of the openings 25 in the driving disc 23. This disc 23 is provided with a hub 41 and bushing 42 turning on the inner bearing surface 13. A sprocket 43 is mounted on the end of the hub 41 and attached by means of bolts 44. A sprocket chain 45 is carried at one point on the sprocket 43 and is driven by a second sprocket 46 which is mounted on the differential shaft 47 arranged beneath the side beams 11 forward of the rear axle 10, and then over a third sprocket 48 carried on one of a pair of jack shafts 49, the other shaft thereof being similarly connected and locked to the former by a clutch mechanism 50, forming the subject matter of my copending application for Letters Patent, filed Feb. 27, 1930, Ser. No. 431,844. Each jack shaft 49 is driven by the sprocket 48 and carries a pinion gear 51 in mesh with the traction gear 24, which turns with a bushing 52 on the hub 41 of the driving disc 23.

A hand hole 53 in the disc 17 directly over the openings 21 allows access to the handle lever yoke 35, so that the latter may be operated from one position to another for the purpose of engaging the tumblers 32 and 34 with driving disc 23 and traction gear 24, respectively.

According to the illustration in Figure 1, the tumbler 32 is shown projected into an opening 25 of the driving disc which is continuously driven through the sprocket 43 and chain 45, at the same speed at which the jack shaft 49 is rotating. Continuously rotating at a greatly reduced speed is the traction gear 24 which of course, is driven indirectly by means of the pinion gear 51 and when the handle lever 35 is swung over towards the inside, the bolts or tumblers 32 and 34 reverse their position, so as to engage the bolt 34 with the traction gear 24, thus giving to the tractor the normal slow speed required for certain purposes.

In the construction illustratively exemplified in Figure 5, the change speed wheel is mounted on a revolving shaft 10' such as the rear axle of a motor car, and keyed to this shaft outside the wheel is a driving disc 23' having a plurality of spaced openings 25' arranged on a line concentric with the periphery thereof. A single bolt 32' is carried by the wheel 15' and is operated by a yoke 35' pivotally mounted and adapted to engage in the notches 39' in the bolt 32'. The bolt 32' projected towards the inside of the wheel enters any one of a series of openings 25" in a traction gear 24' turning on the shaft 10' adjacent the inside face of the traction wheel 15'. The traction gear 24' is operated through a spur gear 51', bearing 51" and sprocket 48', then through chain 45' to a sprocket 43' keyed to the axle shaft 10' adjacent the traction gear. In this construction the traction wheel 15' carries no cap, but the wheel and driving disc 23' are held in place on the shaft 10' by a collar 52 pinned to the end of the shaft.

The operation of the bolt or tumbler projecting means is as follows: The handle lever 35 in moving from one position to the other, brings the spring 38 under tension as it reaches substantially one half its throw, and as the lever 35 passes dead center, the spring end of the link 29 is drawn in the direction of the movement of the handle lever by the spring. As the link moves on its pivot, one bolt is withdrawn from one driving member and the other bolt is projected into the other driving member, whereby the wheel is driven at the speed of the engaged driving member. The position taken by the outermost bolt 36 subsequent to each projection or retraction thereof is such, that the cross piece of the handle yoke drops into one or the other of the grooves 39 and locks the bolts against further movement until the handle is again shifted to its other position.

Having now described my invention, what I claim and desire to secure by Letters Patent, is:

1. In a change speed for motor vehicles, the combination with an axle, of traction wheels mounted to turn on said axle, a driving disc mounted to turn around said axle adjacent each wheel, a traction gear turning on the hub of said disc, axially projecting means for engaging the driving disc or traction gear with the wheel, and means for driving said driving disc and traction gear at relative speeds.

2. In a change speed for motor vehicles, the combiantion with an axle, of a traction wheel mounted to turn on said axle, a plurality of driving members adjacent said wheel and mounted to turn on said axle, means for driving said driving members at relative speeds, and selective means comprising alternately projecting members for engaging said wheel with any one of said driving members.

3. In a change speed for motor vehicles, the combination with a rear axle, of traction wheels mounted to turn on said axles, a driving disc mounted to turn on said axle, a sprocket driving said disc, a traction gear turning on said disc, means for engaging either the driving disc or traction gear with said wheel, and means for simultaneously rotating the disc and gear at relative speeds, comprising a sprocket and chain connection with the sprocket of the disc and a pinion gear turning with the former sprocket and in mesh with the traction gear.

4. A change speed for motor vehicles, as claimed in claim 3, in which the means for engaging the disc and traction gear comprises a pair of tumblers supported for axial movement in said wheel, the disc and gear being provided with openings to be brought into register with the path of movement of said tumblers, and means for simultaneously projecting one tumbler and retracting the other to connect and release the wheel with either the disc or traction gear.

5. A change speed for motor vehicles, as claimed in claim 3, in which the means for engaging the disc and traction gear comprises a pair of tumblers supported for relative axial movement in said wheel, said disc and wheel being provided with openings to be brought into register with the path of movement of the tumblers, a pivoted link connected at its ends to said tumblers, a handle yoke embracing one of said tumblers and adapted to engage in grooves in the latter in its extreme positions, and a resilient connection between the yoke and the link, whereby movement of the former brings the connection under tension to swing the link in the direction of the handle and throw the tumblers in opposite directions.

6. In a change speed for motor vehicles, the combination of a rear axle, traction wheels for said axle, and means for driving each traction wheel, comprising a driving disc and traction gear mounted for relative movement with respect to each other on the axle, means for simultaneously engaging and disengaging the traction wheel with either the driving disc or traction gear, a pair of jack shafts to effect corresponding movement in traction wheels, a clutch for said shafts, differential drive shafts, a chain and sprocket connection for each driving disc, jack shaft and differential shaft, and a pinion keyed to each jack shaft and in mesh with a traction gear.

7. In a tumbler mechanism the combination of a pivoted yoke comprising arms and a cross bar at the free ends thereof, spring means carried at one end by the yoke, a tumbler bolt to which the other end of the spring is attached, the bolt being actuated to move longitudinally by said spring and provided with grooves to receive the cross bar of the yoke in its extreme positions, and to lock the bolt against longitudinal displacement.

In testimony whereof I affix my signature.

FREDERIC W. JAMES.